April 30, 1957 — M. BILLON — 2,790,387
VEHICLE OPERATED HYDRAULIC DEVICE
Filed Nov. 21, 1951 — 2 Sheets-Sheet 1
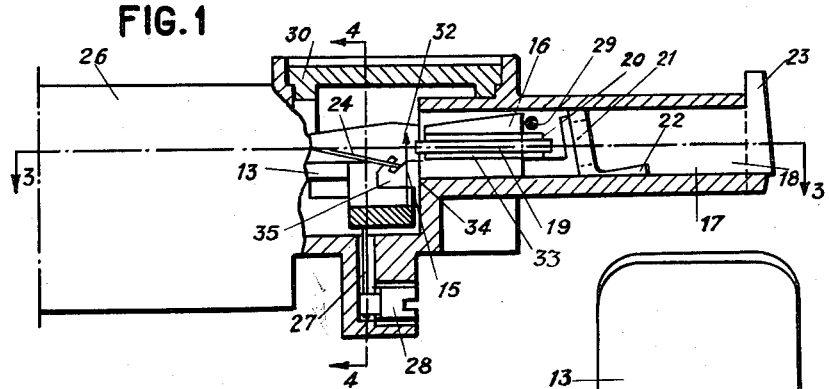
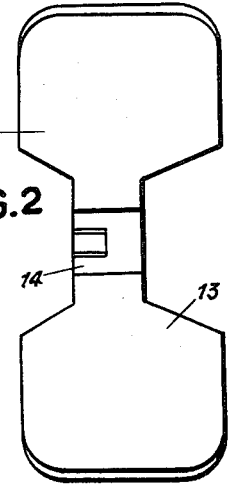
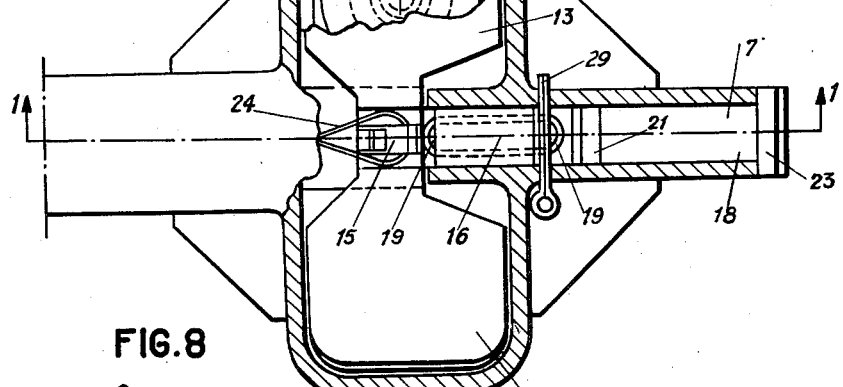
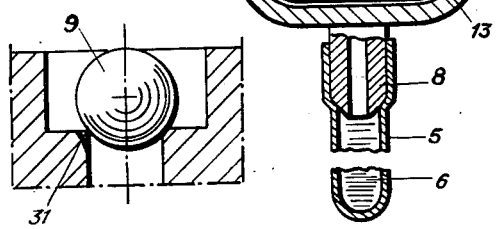
INVENTOR
MARCEL BILLON
BY Paul M. Craig, Jr.
ATTORNEY

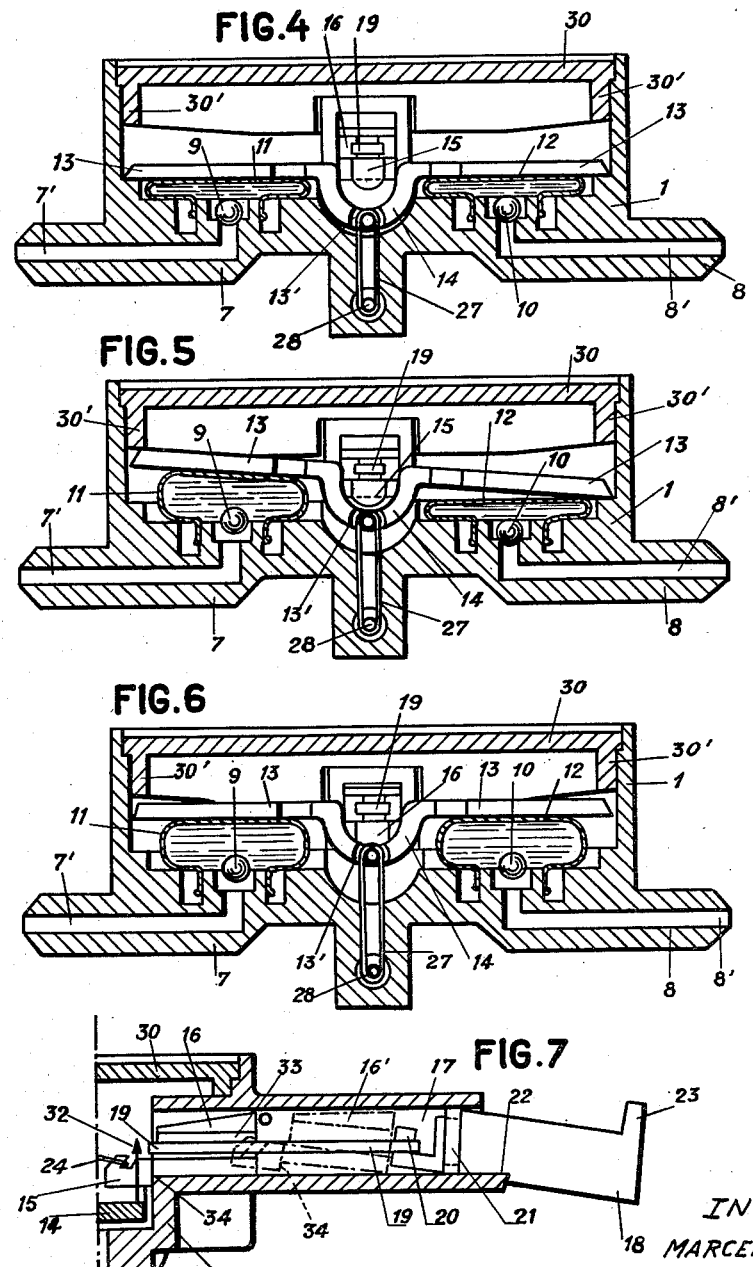

United States Patent Office 2,790,387
Patented Apr. 30, 1957

2,790,387

VEHICLE OPERATED HYDRAULIC DEVICE

Marcel Billon, Paris, France, assignor to Compagnie Generale pour l'Equipement Aeronautique, Paris, France, a corporation of France Application November 21, 1951, Serial No. 257,608

Claims priority, application France December 2, 1950

12 Claims. (Cl. 102—8)

The present invention relates to devices intended to be actuated by the passage of vehicles and, in particular, to such devices which comprise for this purpose one or more deformable tubes filled with liquid and connected with a box-like control member operative to be tripped or set off as the result of deformations of the tubes caused by the passage of a vehicle.

Accordingly, it is a primary object of the present invention to provide a control arrangement for tripping the box-like control member by a particular position of the vehicle with reference to such member.

The present invention is more particularly intended to permit the tripping of the box-like control member only when this member is in a position in which it is located under the vehicle between the two wheels or rolling members of the vehicle.

The present invention is more particularly intended to permit the association of the box-like member with an anti-vehicle mine to control the firing of the latter. This arrangement is intended to permit the explosion of the mine only when it becomes located under the body of the vehicle between the two wheels or rolling members, such as, for example, the treads thereof. Explosions are thereby avoided which are ineffective or only slightly effective, and which with ordinary types of mines may follow the impact of only one of the wheels or treads of the vehicle thereby damaging very often only this one wheel or tread alone, which damage can soon be repaired.

In contradistinction thereto, by virtue of the present invention, the mine can explode only when it will destroy the essential parts of the vehicle and its personnel.

This invention has for its object a device which provides an accurate control thereof and which comprises a tripping mechanism, two chambers filled with a fluid and each having a mobile wall whose position depends on the quantity of fluid contained in the chamber, two tubes with deformable walls filled with a fluid and which are arranged in different directions along the eventual path of the vehicle and which are, respectively, connected at one end thereof to one of these chambers, and a control member which is susceptible of being displaced by displacements of each of the movable walls and which is arranged in such a manner as to trip the firing mechanism only when the movable walls are each displaced by a distance greater than a predetermined amount.

Other objects, features, and advantages of the present invention will appear from the following description of one embodiment of the present invention when taken in connection with the attached drawings in which Figure 1 is a view in elevation of one embodiment of a vehicle operated hydraulic device according to the present invention partially in cross section and taken along line 1—1 of Figure 3;

Figure 2 is a plan view of the control member 13 of the vehicle operated hydraulic device of Figure 1;

Figure 3 is a plan view of the vehicle operated hydraulic device of Figure 1 partially in cross section taken along line 3—3 of Figure 1 with certain parts broken away for the sake of clarity;

Figure 4 is a cross-sectional view of the vehicle operated hydraulic device of Figure 1 without its flexible tubes, taken along line 4—4 of Figure 1;

Figures 5 and 6 are cross-sectional views similar to that of Figure 4 but showing the vehicle operated hydraulic device in different phases of operation thereof;

Figure 7 is a view similar to Figure 1 showing the right-hand portion thereof with the release member in different operative conditions, and Figure 8 is a cross-sectional view on a larger scale of a detail of one of the valves 9 and 10 providing restricted delayed-escape channels for the liquid by means of which the tubes 4 and 5 are connected to the chambers 11 and 12.

The embodiment of the present invention shown in Figures 1 to 8 is particularly intended to be adapted to a non-magnetic anti-tank mine in order to cause it to explode when it is actually underneath the body of the vehicle which is to be hit by this mine and only when the mine is between the means producing forward locomotion of the vehicle or rolling ground engaging members, such as wheels, treads, etc.

The vehicle operated hydraulic device in accordance with the present invention comprises two chambers formed by elastic bladders 11 and 12 arranged inside of a box-like member or casing 1 closed by a lid 30. The bladders 11 and 12 are in communication with tubes 4 and 5 respectively, which tubes have flexible walls and are filled with liquid 6. Each of the tubes 4 and 5 is mounted over one of the two opposite ends of the adjutages or discharge tubes 7 and 8 provided with restricted passages 7' and 8' forming nozzles, the ends of adjutages 7 and 8 opening horizontally on the outside of the casing 1 and forming an integral part thereof. The other end of these adjutages 7 and 8 open vertically at about the same level inside the casing 1 and the bladders 11 and 12 are each mounted with the openings thereof over one of the vertical ends of the adjutages or discharge tubes 7 and 8.

The openings of the nozzle-like discharge tubes 7 and 8 which terminate in the bladders 11 and 12 serve simultaneously as seats for balls 9 and 10 which form check valves when in the normal rest positions which they assume by gravity or, if required, by any other suitable device usual for such valves. These balls 9 and 10 render it possible to oppose the return of the liquid into the tubes 4 and 5. As shown in Figure 8, a small escape channel 31 is arranged along the edge of the valve seats to ensure, nevertheless, a slow return of the liquid into the tubes 4 and 5, particularly when the cause which produced crushing thereof has disappeared.

The bladders 11 and 12 are arranged on both sides of one of the axes of the vehicle operated hydraulic device and support in their turn by the upper portion thereof a rocking blade 13, shown in Figure 2. The central portion 14 of this blade 13 is suitably narrowed and bent back or curved downwardly so as to be placed below and in vertical alignment with the rear portion 15 of a member 16 intended to slide within a channel 17 of rectangular cross section in order to form the release member for the vehicle operated device in accordance with the present invention.

In order to constantly draw the blade 13 in the direction towards the bladders 11 and 12, the central portion of this blade 13 is connected to the casing 1 by a rubber ring 27 which engages, on the one hand, a slot 13' provided in this central portion of the blade 13 and, on the other hand, passes underneath a screw member 28 mounted in the casing 1 in the form of a stopper.

The lid 30 comprises an internal extension 30' which projects into the inside of the casing 1 and of which two of the sides are each capable of being abutted by one of the ends of the blade 13 so as to limit the displacement of the blade 13 on the corresponding side thereof which is caused by the expansion of that bladder on which this side of the blade 13 rests.

As shown in Figure 7, an arming member 18, also guided in channel 17, is connected to the release member 16 by a rubber ring 19 surrounding the release member 16 and extending in longitudinal grooves 33 provided therein in order to fasten on to a hook 20 forming part of the arming member 18.

A notch 22 arranged at the lower left part of the arming member 18, as viewed in Figure 1, renders it possible to fasten the latter to the casing 1 in the position thereof shown in Figure 7 by engaging in this notch one of the external ridges formed by the outer mouth of channel 17. A rubber joint 21 arranged in a neck of the member 18 ensures tightness between this member 18 and the walls of the channel 17.

The release member 16, despite the force exerted by the rubber ring 19 toward the right, as viewed in Figures 1 and 7, especially when the member 18 is in the armed position of Figure 7, is held in place by a catch or cut-out portion 34 resting on one of the ridges of the inner mouth of the channel 17 opening into the chamber formed by the casing. This catch or cut-out portion 34 is formed by the part 15 of the release member 16 which thereby continues to project in the path of the central portion of the blade 13 when the bladders expand.

Furthermore, the part 15 of the release member 16 comprises a hook 35, in which is fastened a loop of the string 24 acting as draw-cord for a firing member (not shown) of a pyrotechnic relay 26 intended to cause the mine to explode. This firing member, which has not been shown in the drawing, may be constituted by any known device such as a small tongue, the sliding movement of which over a fixed and rough part causes firing.

The release or trigger member 16 is so arranged and constructed as to be able to oscillate or pivot slightly on itself within the channel 17 under the action of the blade 13 in order to release the catch 34 formed by its part 15 and to come into position 16', shown in dotted lines in Figure 7, by the force exerted by rubber ring 19. The draw-cord 24 is thereby carried along simultaneously during this movement of the release member 16 to cause the firing device to operate.

As shown in Figure 1, the arming member 18, may also be brought up against the release member 16 in order to keep the release member 16 in its normal position before setting the device into striking or armed position. This normal position is obtained by disengaging the notch 22 by which the member 18 is kept in the position of Figure 7. A protruding part 23 facilitates gripping thereof in order to arm the device anew.

Still greater safety in operation may be obtained by means of a pin 29 which passes through channel 17 to oppose the release of the device as long as this pin 29 is kept in place.

What is claimed is:

1. A device intended to be tripped by the passage of a vehicle, comprising a tripping mechanism; a box wherein are arranged two chambers filled with a fluid, each chamber having a wall which is displaceable in parallel directions whose position depends on the quantity of fluid in the chamber; two tubes with deformable walls filled with a fluid and which are arranged in different directions along the eventual path of the vehicle and which are connected respectively by one end to one of said chambers, a control member supported by said displaceable walls at distinct points to be displaced by these supporting points when the movable walls are in movement; an elastic member connecting a fixed point of the box to said control member at a point situated between said points of support to guide the latter to apply to each of said displaceable walls a pressure of the sense opposite to the pressure of the fluid when the corresponding tube is crushed; and finally a tripping member which is arranged in part along the path of said control member at a certain distance from the latter to be engaged by one of the points of the latter situated between said points of support in such manner as to be itself displaced when both said chambers have attained a sufficient volume, this latter displacement of the tripping member then causing the operation of said tripping mechanism.

2. A device according to claim 1, comprising a member forming an integral abutment of said box and limiting the displacement of each of the movable walls when the volume of the corresponding chamber increases.

3. A device according to claim 1, comprising two members forming integral abutments of said box and each arranged in such manner as to be engaged by said control member at points situated outside of said points of support on said movable walls and on both sides of said points of support.

4. A device according to claim 1, comprising on the one hand a recoil member which tends to displace the tripping member in a direction perpendicular to the displacement of said control member under the effect of a simultaneous increase of the volume of the two chambers, and on the other hand a notch provided in the tripping member and a piece integral with said box which may be hookingly engaged by said notch in such manner that said control member when displaced can cause disengagement of the tripping member from this hooking engagement.

5. A device according to claim 4, wherein the tripping member is guided in a channel member which is integral with said box and maintains this tripping member in part projecting on the orifice of the channel member when it is hookingly engaged by said notch.

6. A device according to claim 5, wherein the recoil member intended to cause displacement of the tripping member is constituted of an elastic band connecting this tripping member to a piece guided in the channel member and which can be immobilized in the latter either at a sufficient distance from the tripping member to cause its displacement when the tripping member becomes freed by the control member, or can be immobilized against the tripping member in order to be opposed on the contrary to the action of the tripping member whatever may be the position of the control member.

7. A device according to claim 1, wherein each of said chambers is connected to one of the tubes by a pipe provided with a check valve which acts in opposition to the return of the liquid from the chamber to the tube connected to the pipe.

8. A device according to claim 7, wherein each of the check valves is provided with an escape channel member of reduced cross section permitting the liquid to pass slowly from the chamber to the tube in spite of the closing of the valve.

9. A device according to claim 1, comprising pipes discharging by one of their ends in the inside of the box substantially at the same level and in directions substantially parallel so that each serves as a support for an elastic bladder member mounted by its orifice at this end to form one of the chambers, the control member resting on the side of these bladder members opposite to their orifices.

10. In anti-vehicle mine apparatus intended to be tripped by the passage of a vehicle only when the mine is located between the rolling ground-engaging members of said vehicle, a firing mechanism with tripping means, two chambers filled with a fluid to provide normal inflation thereof and each having a movable wall whose position depends on the quantity of fluid contained in the respective chamber, two tubes each having a deformable wall filled with a fluid which extend in substantially opposite direction on opposite sides of said anti-vehicle mine apparatus and of sufficient length to be actuated by the ground-engaging members of a vehicle, said two tubes being each respectively connected at one end thereof to the corresponding one of said chambers, and control means positioned to be movable into engagement with said tripping means to enable release of said tripping means only upon essentially simultaneous inflation of both of said chambers by a predetermined amount in excess of said normal inflation, said control means including a unitary control member displaceable by each of the movable walls of said chambers and means engaging said control member and constantly urging said control member into engagement with the walls of said chambers.

11. Apparatus according to claim 10, further comprising a pipe connecting each of said chambers to one of said tubes, and a check valve interposed in each said pipe and which acts in opposition to the return of the liquid from the said chamber to the tube connected to the said pipe.

12. Apparatus according to claim 11, further comprising escape channel means arranged as a by-pass to each said check valve, each said escape channel means being of reduced cross section and permitting the liquid to pass slowly from the chamber to the tube in spite of the closing of the check valve.

References Cited in the file of this patent

UNITED STATES PATENTS

| | | |
|---|---|---|
| 1,016,395 | Brown | Feb. 6, 1912 |
| 1,459,317 | Birdsall | June 19, 1923 |
| 1,915,167 | Salsbury | June 20, 1933 |
| 2,188,948 | Huebner | Feb. 6, 1940 |
| 2,337,455 | Davis | Dec. 21, 1943 |
| 2,377,174 | Parker | May 29, 1945 |
| 2,562,847 | Spencer | July 31, 1951 |

FOREIGN PATENTS

| | | |
|---|---|---|
| 29,013 | France | Jan. 27, 1925 |
| | (1st addition of 557,110) | |